United States Patent
Pfeiffer et al.

[11] 3,912,776
[45] Oct. 14, 1975

[54] NOVEL HYDROXY- AND ALKOXY-ACETAMIDOTRIIODOBENZOIC ACIDS

[75] Inventors: Heinrich Pfeiffer; Wolfgang Beich; Georg Zollner, all of Berlin, Germany

[73] Assignee: Schering Aktiengesellschaft, Berlin and Bergkamen, Germany

[22] Filed: May 15, 1972

[21] Appl. No.: 253,026

[30] Foreign Application Priority Data
May 15, 1971 Germany............................ 2124904

[52] U.S. Cl...... 260/501.11; 260/247.2 R; 260/519; 424/5
[51] Int. Cl.²........................................ C07C 103/34
[58] Field of Search......... 260/519, 501.11, 247.2 R

[56] References Cited
UNITED STATES PATENTS

| | | | |
|---|---|---|---|
| 3,076,024 | 1/1963 | Larsen | 260/519 |
| 3,360,436 | 12/1967 | Felder et al | 424/5 |
| 3,389,170 | 6/1968 | Habicht et al | 260/519 |

FOREIGN PATENTS OR APPLICATIONS

| | | | |
|---|---|---|---|
| 5,177 | 6/1967 | France | 424/5 |
| 1,129,260 | 5/1962 | Germany | 260/519 |

Primary Examiner—James A. Patten
Assistant Examiner—L. A. Thaxton
Attorney, Agent, or Firm—Millen, Raptes & White

[57] ABSTRACT

Hydroxy- and alkoxy-acetamidotriiodobenzoic acids of the formula

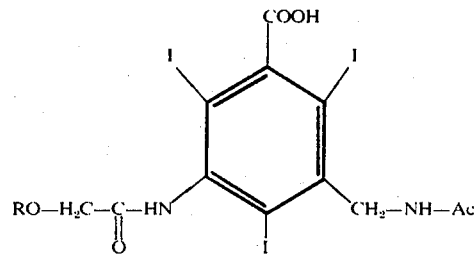

wherein R is a hydrogen atom or lower-alkyl of 1–4 carbon atoms and Ac is alkanoyl of up to 4 carbon atoms; mixtures thereof and the physiologically acceptable salts thereof with a base are useful as intravenous radiopaque agents which do not increase peripheral resistance or decrease cardiac output.

9 Claims, No Drawings

NOVEL HYDROXY- AND ALKOXY-ACETAMIDOTRIIODOBENZOIC ACIDS

BACKGROUND OF THE INVENTION

This invention relates to novel hydroxy- and alkoxy-acetamidotriiodobenzoic acids, to processes for the preparation thereof, to radiopaque agents comprising them and to the use thereof in radiology.

Compounds to be used as intravenous radiopaque agents must meet very high requirements with respect to vascular system compability and pharmacological inertness. 3,5-Di-substituted-2,4,6-triiodobenzoic acids wherein the 3 substituents are lower-alkanoylamidomethyl and the 5 substituents are lower-alkanoylamido are known, e.g., U.S. Pat. No. 3,360,436. These compounds are further described in Helvetica Chimica Acta, Volume 48 (1965), pages 259 to 261.

The compounds presently employed effect, within 20–30 minutes after administration, an increase in the functional output of the heart, followed by depression thereof so that the cardiac output efficiency falls below initial values. Up to the second hour after application, the cardiac output drops continuously. To prevent collapse, the circulatory system is forced to increase the peripheral total resistance by 50–100%. With labile patients, there is the danger of transition to so-called centralization with resultant circulatory shock and all its dangers.

Accordingly, it is an object of this invention to provide radiopaque compounds which have a lesser adverse effect on the circulatory system.

SUMMARY OF THE INVENTION

The novel compounds of this invention are hydroxy- and alkoxy-acetamidotriiodobenzoic acids of the general Formula I

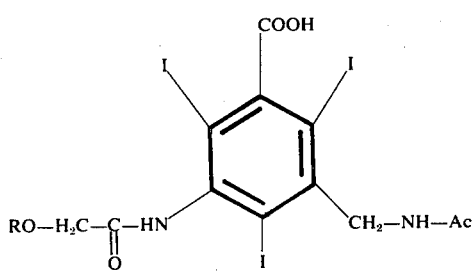

wherein R is a hydrogen atom or lower-alkyl of 1–4 carbon atoms and Ac is alkanoyl of up to 4 carbon atoms; mixtures thereof and the physiologically acceptable salts thereof with a base.

These novel iodine compounds are useful as intravenous radiopaque agents, e.g., for intravenous urography and angiography.

DETAILED DISCUSSION

The compounds of this invention include both the free acids of Formula I and their metal, ammonium and amine salts, which can be prepared by reacting the free acid with a base. The compounds of this invention are usually employed as radiopaque agents in the form of their water soluble non-toxic, i.e., physiologically acceptable, salts.

This invention comprises the compounds of Formula I, both singly and mixtures thereof, in free acid form and as salts with bases.

Examples of physiologically acceptable bases are alkali-metal hydroxide, e.g., sodium hydroxide, lithium hydroxide, alkaline earth hydroxides, e.g., calcium hydroxide, magnesium hydroxide, ammonium hydroxide and amines, e.g., N-methylglucamine, N,N-dimethylglucamine, ethanolamine, diethanolamine, morpholine, etc. The saccharidyl amines, especially methylglucamine, are preferred.

Because the compounds of this invention are useful as intravenously injectable radiopaque agents, the preferred salts of the compounds of Formula I are those which are water-soluble and non-toxic, i.e., pharmaceutically acceptable, especially those whose solutions in a pharmaceutically acceptable carrier are intravenously injectable.

Examples of metal salts of the free acids of Formula I are the sodium, potassium, lithium, calcium, magnesium or any other mono-, di- or polyvalent metal salt, of which the sodium salt is preferred.

Examples of amine salts are mono-, di- and tri-alkyl amines, hydroxyalkylamines, alkyl(hydroxyalkyl)amines and di(hydroxyalkyl)amines, wherein alkyl in each instance preferably contains 1-12, more preferably 1-4 carbon atoms, e.g., methyl, ethyl, n-propyl, 2-propyl, n-butyl, isobutyl, tert.-butyl, including trimethylamine, diethylamine, ethanolamine, diethanolamine and polyhydroxy-alkylamines, e.g., saccharidyl amines, including glucamine and methylglucamine and N,N-dimethylglucamine.

The novel compounds of this invention, when administered, cause neither a reduction in cardiac output nor a rise in peripheral total resistance. The cardiac outputs per beat and per minute do not drop below initial values. The total peripheral resistance need not be increased to a dangerous amount and remains in the range of its initial values. Tables 1–3 show the results on beagles to whom were administered intravenously a solution of one of the following three compounds A : 3-acetamidomethyl-5-acetamido-2,4,6-triiodobenzoic acid ("Iodamid", a commercial preparation),
B : Compound of Formula I wherein R = H, Ac = CH₃CO (Example 1),
C : Compound of Formula I wherein R = CH₃, Ac = CH₃CO (Example 2).

All tested solutions were employed as methylglucamine salts at concentrations which provided 300 mg. iodine/ml.

| Solution A: | |
|---|---|
| 3-Acetamidomethyl-5-acetamido-2,4,6-triiodobenzoic acid | 49.45 g. |
| N-Methylglucamine | 15.4 g. |
| Disodium edetate | 0.01 g. |
| Water | ad. 100 ml. |
| Solution B: | |
| 3-Acetamidomethyl-5-hydroxyacetamido-2,4,6-triiodobenzoic acid | 50.7 g. |
| N-Methylglucamine | 15.4 g. |
| Disodium edetate | 0.01 g. |
| Water | ad. 100 ml. |
| Solution C: | |
| 3-Acetamidomethyl-5-methoxyacetamido-2,4,6-triiodobenzoic acid | 51.8 g. |
| N-Methylglucamine | 15.4 g. |
| Disodium edetate | 0.01 g. |
| Water | ad. 100 ml. |

TABLE 1

Averaged beat outputs [impulse volumes] of groups of respectively three beagle dogs which had been injected once per experiment with 4 ml./kg. of the radiopaque agents within 9 seconds into a vena femoralis.

| Time in Minutes After Application | [Mean] Averaged Initial Value | A 3-Acetamido-methyl-5-acet-amido-2,4,6-triiodobenzoic Acid | B 3-Acetamido-methyl-5-hy-droxyacet-amido-2,4,6-triiodobenzoic Acid | C 3-Acetamido-methyl-5-methoxyacet-amido-2,4,6-triiodobenzoic Acid |
|---|---|---|---|---|
| 10 | 100 | 127 | 167 | 150 |
| 20 | 100 | 97 | 148 | 133 |
| 30 | 100 | 94 | 153 | 120 |
| 40 | 100 | 79 | 164 | 117 |
| 50 | 100 | 66 | 164 | 118 |
| 60 | 100 | 72 | 169 | 122 |
| 70 | 100 | 67 | 170 | 121 |
| 80 | 100 | 65 | 176 | 122 |
| 90 | 100 | 65 | 180 | 130 |
| 100 | 100 | 64 | 187 | 130 |
| 110 | 100 | 64 | 194 | 129 |
| 120 | 100 | 60 | 197 | 130 |

TABLE 2

Averaged cardiac outputs per minute of groups of respectively three beagle dogs which had been injected once per experiment with 4 ml./kg. of the radiopaque agents within 9 seconds into a vena femoralis.

| Time in Minutes After Application | Averaged Initial Value | A 3-Acetamido-methyl-5-acet-amido-2,4,6-triiodobenzoic Acid | B 3-Acetamido-methyl-5-hy-droxyacet-amido-2,4,6-triiodobenzoic Acid | C 3-Acetamido-methyl-5-methoxyacet-amido-2,4,6-triiodobenzoic Acid |
|---|---|---|---|---|
| 10 | 100 | 128 | 154 | 143 |
| 20 | 100 | 99 | 137 | 127 |
| 30 | 100 | 96 | 139 | 114 |
| 40 | 100 | 76 | 148 | 110 |
| 50 | 100 | 64 | 147 | 110 |
| 60 | 100 | 63 | 151 | 110 |
| 70 | 100 | 65 | 151 | 110 |
| 80 | 100 | 63 | 151 | 112 |
| 90 | 100 | 63 | 153 | 116 |
| 100 | 100 | 60 | 161 | 119 |
| 110 | 100 | 57 | 167 | 119 |
| 120 | 100 | 57 | 170 | 123 |

TABLE 3

Averaged peripheral total resistance of groups of respectively three beagle dogs which had been injected once per experiment with 4 ml./kg. of the radiopaque agents within 9 seconds into a vena femoralis.

| Time in Minutes After Application | Averaged Initial Value | A 3-Acetamido-methyl-5-acet-amido-2,4,6-triiodobenzoic Acid | B 3-Acetamido-methyl-5-hy-droxyacet-amido-2,4,6-triiodobenzoic Acid | C 3-Acetamido-methyl-5-methoxyacet-amido-2,4,6-triiodobenzoic Acid |
|---|---|---|---|---|
| 10 | 100 | 87 | 63 | 70 |
| 20 | 100 | 104 | 72 | 96 |
| 30 | 100 | 104 | 62 | 90 |
| 40 | 100 | 122 | 60 | 104 |
| 50 | 100 | 147 | 60 | 108 |
| 60 | 100 | 135 | 58 | 103 |
| 70 | 100 | 146 | 58 | 108 |
| 80 | 100 | 154 | 58 | 106 |
| 90 | 100 | 160 | 55 | 96 |
| 100 | 100 | 162 | 54 | 98 |
| 110 | 100 | 170 | 54 | 99 |
| 120 | 100 | 171 | 53 | 98 |

It was surprising the presence of an RO instead of H on the 5-acetamido group of compounds of the general Formula I has such a favorable effect on the circulatory behavior of patients to whom the compounds are administered. Moreover, the novel compounds of this invention form salts with bases which are readily soluble in water. Their solutions exhibit high tissue compatibility and are excreted by the patient rapidly and unchanged by the kidneys. These properties make the novel compounds of this invention particularly valuable for X-ray diagnostics.

This invention, accordingly, relates to hydroxy- and alkoxy-acetamidotriiodobenzoic acids of the general Formula I and their physiologically acceptable salts with bases and to radiopaque agents comprising the contrast-medium component of one or more compounds of Formula I in a pharmaceutically acceptable carrier.

The novel hydroxy- and alkoxyacetamidotriiodobenzoic acids of the general Formula I can be produced by acylating, in a conventional manner, 5-amino-2,4,6-triiodobenzoic acids of the general Formula II

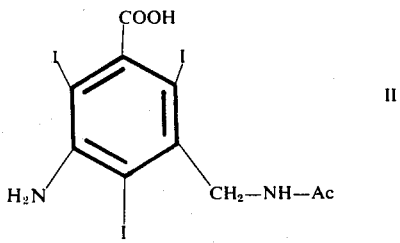

II wherein Ac has the values given for Formula I, with the corresponding acid halogenide or anhydride. If compounds of the general Formula I wherein R = H are desired, the acyloxyacetyl residue is first introduced and thereafter the O-acyl derivative is saponified. The salts are formed with physiologically acceptable bases in the conventional manner. Preferred acid halogenides are acetoxyacetyl, methoxyacetyl, ethoxyacetyl, propoxyacetyl and butoxyacetyl chloride or bromide. The acylation is preferably conducted in an inert solvent, e.g., dimethylacetamide.

The compounds are administered in a conventional manner. As intravenous urographic agents, usually about 100–3000 mg/kg. body weight is administered intraveneously, e.g., as a 15–80% weight by volume aqueous solution.

Without further elaboration, it is believed that one skilled in the art can, using the preceding description, utilize the present invention to its fullest extent. The following preferred specific embodiments, are, therefore, to be constructed as merely illustrative, and not limitative of the remainder of the disclosure in any way whatsoever.

EXAMPLE 1

3-Acetamidomethyl-5-hydroxyacetamido-2,4,6-triiodobenzoic Acid

A solution of 23.4 g. of 3-acetamidomethyl-5-amino-2,4,6-triiodobenzoic acid in 46 ml. of dimethylacetamide is mixed under ice cooling and agitation dropwise with 13.2 g. of acetoxyacetyl chloride, and the mixture is then further agitated for 18 hours without cooling. Then, the reaction mixture is diluted with 400 ml. of water and, for saponifying the acetoxyacetyl group, gently saponified on a steam bath with the dropwise addition of 2N sodium hydroxide solution to a pH of 9 within 30 to 60 minutes. Finally, under ice cooling, 3-acetamidomethyl-5-hydroxyacetamido-2,4,6-triiodobenzoic acid is precipitated with hydrochloric acid and, after stirring overnight, vacuum-filtered. By purification of the crude product over the methylamine salt isolated from methanol, dissolution in water, and reprecipitation with hydrochloric acid, 18.5 g. = 72% of theory of 3-acetamidomethyl-5-hydroxyacetamido-2,4,6-triiodobenzoic acid is obtained, m.p. from 180° C. under decomposition.

Analogously to the above procedure, 3-propionamidomethyl-5-hydroxyacetamido-2,4,6-triiodobenzoic acid, m.p. from 150° C. (under decomposition), yield: 88%, is obtained from 3-propionamidomethyl-5-amino-2,4,6-triiodobenzoic acid.

EXAMPLE 2

3-Acetamidomethyl-5-methoxyacetamido-2,4,6-triiodobenzoic Acid 36 ml. of methoxyacetic acid in 120 ml. of dimethylformamide is mixed under ice cooling dropwise with 34.8 ml. of thionyl chloride and agitated for 30 minutes. Thereafter, a suspension of 117 g. of 3-acetamidomethyl-5-amino-2,4,6-triiodobenzoic acid 120 ml. of 97% strength dimethylformamide is added thereto. After agitation overnight, the solution is poured into 1.6 l. of water. For purification purposes, the crude product is isolated from ethanol as the dicyclohexylamine salt and converted, in water, with sulfuric acid into the pure acid.

Yield: 105 g. = 80% of theory of 3-acetoamidomethyl-5-methoxyacetamido-2,4,6-triiodobenzoic acid, m.p. 262°–264° C. under decomposition.

Analogously to the above, 3-propionamidomethyl-5-methoxyacetamido-2,4,6-triiodobenzoic acid, m.p. from 204° C. (under decomposition), yield: 77%, is produced from 3-propionamidomethyl-5-amino-2,4,6-triiodobenzoic acid.

EXAMPLE 3

3-Acetamidomethyl-5-ethoxyacetamido-2,4,6-triiodobenzoic Acid

With the use of ethoxyacetic acid in place of methoxyacetic acid, 3-acetamidomethyl-5-ethoxyacetamido-2,4,6-triiodobenzoic acid is obtained analogously to Example 2, which compound is purified via the cyclohexylamine salt.

Yield: 83% of theory; m.p. 258°–260° C. under decomposition.

EXAMPLE 4

Preparation of a solution for intravenous urography:

| | |
|---|---|
| 3-Acetamidomethyl-5-hydroxyacetamido-2,4,6-triiodobenzoic acid | 50.7 g. |
| N-Methylglucamine | 15.4 g. |
| Disodium edetate | 0.01 g. |
| Water | ad. 100 ml. |

The solution is filled into receptacles and sterilized under heating.

EXAMPLE 5

Preparation of a solution for angiography:

| | |
|---|---|
| 3-Acetamidomethyl-5-methoxyacetamido-2,4,6-triiodobenzoic acid | 65.63 g. |
| N-Methylglucamine | 12.21 g. |
| Ethanolamine | 2.26 g. |
| Disodium edetate | 0.01 g. |
| Water | ad. 100 ml. |

The solution is filled into receptacles and sterilized under heating.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Hydroxy- and alkoxy-acetamidotriiodobenzoic acids of the formula

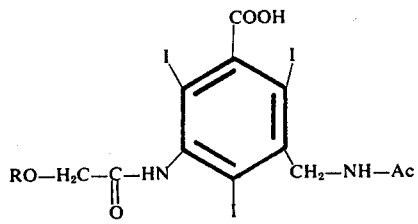

wherein R is a hydrogen atom or lower-alkyl of 1–4 carbon atoms and Ac is alkanoyl of up to 4 carbon atoms, and the physiologically acceptable water soluble salts thereof.

2. An alkali-metal salt of a compound of claim 1.
3. An amine salt of a compound of claim 1.
4. The N-methyl-glucamine salt of a compound of claim 1.

5. A compound of claim 1, 3-acetamidomethyl-5-hydroxyacetamido-2,4,6-triiodobenzoic acid.

6. A compound of claim 1, 3-propionamidomethyl-5-hydroxyacetamido-2,4,6-triiodobenzoic acid.

7. A compound of claim 1, 3-acetamidomethyl-5-methoxyacetamido-2,4,6-triiodobenzoic acid.

8. A compound of claim 1, 3-propionamidomethyl-5-methoxyacetamido-2,4,6-triiodobenzoic acid.

9. A compound of claim 1, 3-acetamidomethyl-5-ethoxyacetamido-2,4,6-triiodobenzoic acid.

* * * * *